(No Model.)

A. W. H. SMITH.
MILK CAN.

No. 309,985. Patented Dec. 30, 1884.

Witnesses:
Chas. L. Goss.
Frank Regensdorf.

Inventor,
Agnes W. H. Smith,
per R. H. Bottum
Attorney.

United States Patent Office.

AGNES W. H. SMITH, OF BEAVER DAM, WISCONSIN.

MILK-CAN.

SPECIFICATION forming part of Letters Patent No. 309,985, dated December 30, 1884.

Application filed October 20, 1883. (No model.)

*To all whom it may concern:*

Be it known that I, AGNES W. H. SMITH, of Beaver Dam, in the county of Dodge and State of Wisconsin, have invented certain new and useful Improvements in Milk-Cans; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to cans for setting and transporting milk; and it consists, essentially, of a can of the ordinary construction inclosed in a cooling-jacket, and of a float to prevent excessive agitation. Its objects are, first, to cool the milk and expel the animal heat; second, to prevent churning of the milk by the agitation incident to transportation, and, third, cleanliness.

In the accompanying drawings like letters refer to same parts in each figure.

Figure 1:
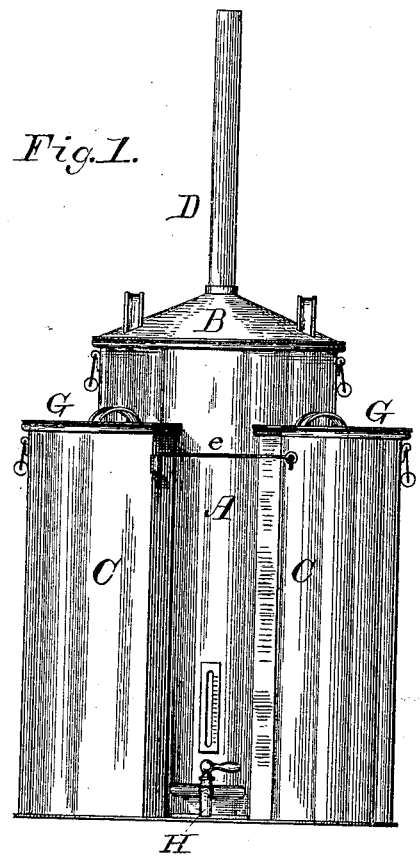
Figure 2:
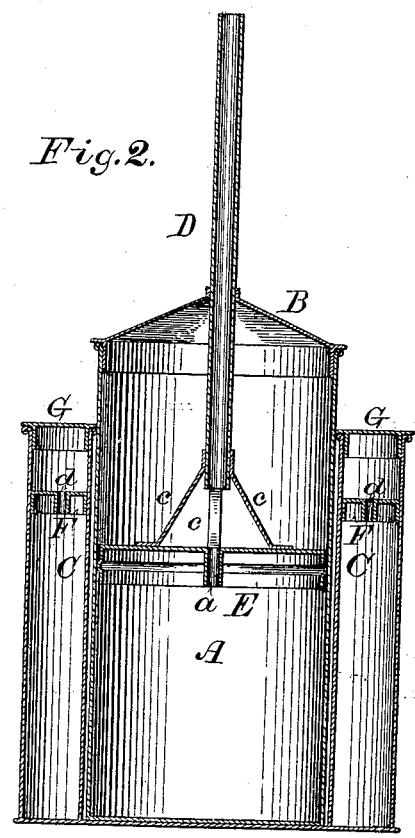
Figure 3:
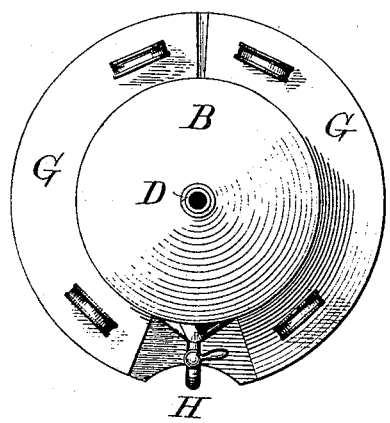

Figure 1 is a front view of my improved can. Fig. 2 is a vertical medial section of the same, and Fig. 3 is a top or plan view.

A represents the can proper, made of tin or any suitable material, in the ordinary cylindrical form. It is provided with the close-fitting cover B, perforated at the center to receive the vent-pipe D.

C C is a removable hollow cooling-jacket, snugly fitting and nearly surrounding and inclosing the sides of can A. It is provided with the covers G G, and also with the float F F, adapted to just fit within the jacket C and to slide freely up and down in the same. It is provided with the small vent-tubes $d\, d$. The can A can be removed at pleasure from its jacket C by releasing the hook $e$, which binds the upper part of the jacket C about the can A.

E is a float composed of a disk provided about its circumference with a downwardly-turned flange or rim, which is horizontally ribbed or fluted to insure a perfect fit with the inside of can A and to hold said float in any desired position when properly adjusted. Said float E is open below, and is provided at or near its center with the vent-tube $a$, opening through said disk directly underneath the pipe D, which is rigidly attached to the float by means of the legs $c\, c$, and serves not only as a ventilator to carry off the animal heat expelled from the milk through the vent $a$, but also as a handle to raise or lower the float to the surface of the milk. By this arrangement and mode of attachment of the ventilating-tube D it always maintains the same relative position to the float, and never comes in contact with the milk. Floats for this class of cans are usually constructed with an air-chamber, to render them sufficiently buoyant to ride upon the surface of the milk, and the ventilating-pipes used in connection therewith as fillers pass loosely through them into the milk underneath, with which they are constantly in contact.

The advantages of my float and ventilating-tube are that they can be more readily scalded and cleansed, since there are no inaccessible chambers or recesses therein, and the ventilating-pipe D never comes in contact with the milk, and is not used for filling the can, and that the ventilating-pipe D, opening directly above the central vent in the float E, furnishes a more direct and natural escape for the animal heat which rises to the surface of the milk. The can A is provided near its base with a faucet, H, for drawing off the milk.

Milk transported in ordinary cans—such as are usually employed for the purpose by milkmen—reaches the consumer warm and partially churned by the agitation and jolting of transportation. When my improved can is used, the water or ice in the refrigerating-jacket C cools the milk in can A, driving the animal heat out through the vent-tubes $a$ and D, and the float E, resting upon the surface of the milk, prevents churning by the jostling of the cans, the jolting of the conveyance, and the consequent agitation of the milk, which comes to the consumer fresh and cool. The float F F, resting upon the surface of the ice-water in the refrigerating-jacket C, prevents the spilling of the same.

Having thus described my invention, what I claim, and desire to secure by Letters Patent, is—

1. The combination, with the can A, of the float E, fitted to bear against the walls of said can sufficiently to hold it in position when properly adjusted, and provided with central vent, a, and the ventilating-pipe D, rigidly attached to its upper side, whereby said pipe serves as a handle for its manipulation, substantially as and for the purposes set forth.

2. The combination, with the can A, of the detachable cylindrical refrigerating-jacket C, cut away in front to receive the faucet H and to permit of the removal of said can, substantially as and for the purposes set forth.

3. The combination of the can A, refrigerating-jacket C, provided with float F, and float E, provided with tubular ventilating-handle D, substantially as and for the purposes set forth.

4. The combination, with the can A, of the float E, composed of a disk provided about its circumference with the right-angled rim fluted or ribbed to fit snugly against the walls of said can, the vent-tube a, and the ventilating-pipe D, rigidly attached to the top of said float, substantially as and for the purposes set forth.

In testimony that I claim the foregoing as my own I affix my signature in presence of two witnesses.

AGNES W. H. SMITH.

Witnesses:
J. E. HOSMER,
E. S. KELLOGG.